United States Patent [19]

Mathieu

[11] 3,895,000

[45] July 15, 1975

[54] PROCESS FOR THE POLYMERIZATION OR COPOLYMERIZATION OF VINYL CHLORIDE

[75] Inventor: Alexis Mathieu, Brussels, Belgium

[73] Assignee: Solvay & Cie., Brussels, Belgium

[22] Filed: Apr. 4, 1973

[21] Appl. No.: 348,264

[30] Foreign Application Priority Data
May 25, 1972   France .............................. 72.18808

[52] U.S. Cl. ...... 260/92.8 W; 260/87.1; 260/87.5 C; 260/DIG. 21; 260/DIG. 15
[51] Int. Cl. ............................ C08f 1/13; C08f 3/30
[58] Field of Search. 260/92.8 W, DIG. 15, DIG. 21

[56] References Cited
UNITED STATES PATENTS

| | | | |
|---|---|---|---|
| 2,674,593 | 4/1954 | Condo .............................. | 260/92.8 |
| 3,226,350 | 12/1965 | Smith ................................ | 260/29.6 |
| 3,311,579 | 3/1967 | Donat ................................ | 260/23 |
| 3,370,028 | 2/1968 | De Wald ............................. | 260/23 |
| 3,546,154 | 12/1970 | Hwa .................................. | 260/29.6 |
| 3,546,193 | 12/1970 | Benetta ............................. | 260/92.8 |

*Primary Examiner*—Joseph L. Schofer
*Assistant Examiner*—John Kight
*Attorney, Agent, or Firm*—Spencer & Kaye

[57] ABSTRACT

Polymers and copolymers of vinyl chloride having good heat stability and antistatic properties are prepared by polymerization in aqueous emulsion in presence of emulsifying agents systems comprising ammonium salts of fatty acids and alkaline alkyl sulphonates or alkyl aryl sulphonates. The latter is gradually introduced during polymerization while the first is present at the beginning of reaction. The ammonium salts are converted into metal salts at the end of polymerization.

9 Claims, No Drawings

PROCESS FOR THE POLYMERIZATION OR COPOLYMERIZATION OF VINYL CHLORIDE

The present invention relates to a process for the polymerisation or copolymerisation of vinyl chloride in aqueous emulsion.

It is common practice to use the technique of polymerisation in aqueous emulsion for the preparation of vinyl chloride polymers. In this process the monomer or monomers is or are polymerised in an aqueous medium in the presence of emulsifying agents and with the help of water-soluble catalysts.

Many compounds have already been used as emulsifying agents.

Of these compounds alkaline alkyl sulphonates and alkyl aryl sulphonates with a long alkyl chain on the one hand and ammonium salts of long chain fatty acids on the other hand are widely used in industry.

The properties of the polymer latices and the polymer itself vary depending on the nature of the emulsifying agent.

Thus the use of alkaline alkyl sulphonates or alkyl aryl sulphonates results in polymers which, when solid, take the form of an anti-static powder with good wettability. These properties are an advantage for certain applications and particularly the production of battery separators and end-products having good anti-static characteristics.

As against this the polymer in the body of the latex is in the form of very small elementary particles of well below 0.03 microns in diameter. The disadvantage of this is that agglomerates readily form within the body of the latex. These agglomerates have to be separated from the polymer, thereby reducing the yield. Furthermore it is obvious that the smaller the polymer particles the more difficult it will be to separate the particles from the aqueous medium by conventional methods such as spray drying. If the emulsifying agents remain in the solid polymer they will impart poor heat stability.

The use of ammonium salts of fatty acids as emulsifying agents produces latices in which the polymer is in the form of larger elementary particles, usually greater than 0.05 microns. Consequently the latices are mechanically stable.

The polymer can then be readily separated from the aqueous phase by spray drying.

Finally ammonium salts of fatty acids have a further advantage that is by no means negligible. Before the polymer is separated from the aqueous phase they can in fact be converted by neutralisation into metal soaps which are preferably alkaline and are excellent heat stabilisers for the polymer.

However, polymers prepared with ammonium salts of fatty acids as emulsifying agents also possess disadvantages for certain applications. In particular the polymer does not exhibit good wettability and is not sufficiently anti-static.

In accordance with the present invention, a process has been developed for the polymerisation or copolymerisation of vinyl chloride in aqueous emulsion which employs both ammonium salts of fatty acids and alkaline alkyl sulphonates or alkyl aryl sulphonates as emulsifying agents. The use of these two types of compound under certain conditions makes it possible to combine their advantages while avoiding their disadvantages.

The present invention relates to a process for the polymerisation or copolymerisation of vinyl chloride in aqueous emulsion, chacterised in that polymerisation is started in the presence of 0.1 to 1.5% by weight, calculated on the monomer charge, of an emulsifying agent selected from the group comprising ammonium salts of long chain fatty acids and mixtures thereof, 0.3 to 2% by weight, calculated on the monomer charge, of an emulsifying agent selected from the group comprising alkaline alkyl sulphonates, alkaline alkyl aryl sulphonates and mixtures thereof is gradually introduced during polymerisation and the ammonium salts are converted into metal salts at the end of polymerisation.

The ammonium salts used as emulsifying agents from the start of polymerisation are preferably derived from saturated fatty acids whose chain contains from 10 to 18 carbon atoms. Examples of these include in particular salts of lauric, myristic, palmitic and stearic acid.

The proportion of ammonium salts employed is unimportant as far as the particle size of the polymer is concerned. From this angle therefore it can safely be above the critical micelle concentration.

However, this amount is a function of the heat stability that it is desired to impart to the polymer by the conversion of the ammonium salt into a metal salt and preferably a sodium soap after polymerisation and before the aqueous phase is separated off. As little as 0.1% by weight calculated on the monomers is sufficient for the first signs of stabilisation to appear. Beyond 1.5% by weight the increase in heat stability is negligible and the polymer then exhibits the disadvantage of insufficient purity. Generally speaking it is preferable to use 0.3 to 1% by weight of ammonium salts of fatty acids.

The alkaline alkyl sulphonates or alkyl aryl sulphonates introduced later preferably possess a long alkyl chain containing from 10 to 18 carbon atoms and preferably 12 to 16 carbon atoms.

The amount of these compounds to be used is a function of the anti-static properties the polymer is required to possess. It has been found that at least 0.3% by weight calculated on the monomers is required for an anti-static effect to appear. Beyond 2% by weight the marginal increase in anti-static properties becomes negligible and does not compensate for the increasing loss of heat stability. The best results are obtained by using 0.5 to 1.5% by weight of alkaline, preferably sodium, alkyl sulphonate or alkyl aryl sulphonate.

The introduction of the alkaline alkyl sulphonates or alkyl aryl sulphonates into the reaction medium starts when the particle size has been established, in other words preferably after conversion has reached 5 to 25% and preferably about 10%. Introduction may be continued until polymerisation ends or until at least 50% and preferably less than 80% conversion has been reached. The rate of introduction is not critical and is generally constant.

To avoid instability of the reaction medium due to inadequate protection of the particles provision should preferably be made for all the alkaline alkyl sulphonate or alkyl aryl sulphonate to be introduced before conversion reaches about 80%.

After polymerisation ceases but before the polymer is separated from the aqueous medium the ammonium salt of the fatty acid is converted into an alkaline salt. This conversion, which is preferably carried out immediately after the unreacted vinyl chloride has been vented and for example after the latex has been cooled to room temperature, is effected by the addition of a basic compound of an alkali metal in aqueous solution, preferably a hydroxide and in particular sodium hydroxide. The amount of basic compound used depends on the amount of ammonium salt present and is preferably between 0.01 and 0.3% by weight calculated on the monomers.

Having now described the particular conditions that characterise the polymerisation process forming the object of the present invention it should be noted that the other polymerisation conditions are the classic conditions used in the polymerisation of vinyl chloride in aqueous emulsion which are well known to persons skilled in the art. Hence the working temperature is generally between 40° and 70°C and the catalyst is a water-soluble free radical catalyst. Examples include hydrogen peroxide, alkaline and ammonium persulphates, Redox systems etc.

The process forming the object of the present invention can be used for the homopolymerisation of vinyl chloride and its copolymerisation with up to 20% by weight of a copolymerisable ethylenically unsaturated comonomer such as vinyl acetate, propylene, ethylene, isobutene etc. The process offers a number of particularly important advantages. It results in mechanically stable latices that can be readily spray dried. It makes it possible to avoid the formation of agglomerates during polymerisation that would be detrimental to the yield. The solid polymers exhibit great heat stability after separation from the aqueous phase and can therefore be shaped under severe conditions while still giving end-products with little discolouration. Furthermore the end-products possess good anti-static characteristics. The polymers can be used in the production, e.g. by powder sintering, of battery separators with minimal discolouration that are readily wetted in electrolytic baths and therefore offer little resistance to the passage of the current which is an important property in this type of application.

A number of different polyvinyl chlorides were prepared to illustrate the advantages of the process of the present invention and were then subjected to various tests to confirm their properties.

Examples 1 to 3 are included for purposes of comparison.

The polymers were prepared under the following conditions:

1,500 g of distilled water, 0.5 g of ammonium persulphate and an ammonium salt of a fatty acid in amounts that varied with the examples (except for Example 3 where the only emulsifying agent was sodium alkyl sulphonate) were introduced at room temperature into a 4 litre autoclave provided with a stirrer and a thermostatically controlled jacket. The whole was blanketed with nitrogen to remove oxygen. 1 g of ammonia was then introduced in the form of an aqueous solution.

The autoclave was closed and 1,000 g of vinyl chloride were introduced. The medium was heated to 50°C. The moment polymerisation started was regarded as being the time $t_o$.

From $t_o + 30$ minutes to $t_o + 3$ hours 30 minutes (except in Examples 1 to 3) sodium alkyl sulphonate or sodium alkyl aryl sulphonate was introduced continuously and at a constant rate in the form of a concentrated aqueous solution in amounts that varied with the examples.

When the pressure in the autoclave had fallen by 5 kg/cm$^2$ the residual vinyl chloride was vented and the latex was cooled. Caustic soda was then added in the form of a dilute solution and in amounts varying with the amount of the ammonium salt of a fatty acid that had been employed.

Conversion was about 95% in all the examples.

The various evaluation tests were then carried out.

The proportion of lumps or agglomerates formed during polymerisation was determined by filtering through a 250 micron sieve. The amount of polymer retained on the sieve gave an idea of the loss in yield that had resulted.

The diameter of the elementary polymer particles in the latex was assessed with an electron microscope.

To determine the mechanical stability of the latex it was introduced into a cylindrical container where it was agitated by means of a toothed disc rotating at high speed. The length of time in seconds required for the lates to coagulate was measured.

This time must exceed about 90 seconds if the latex is to be safely subjected to spray drying.

The heat stability of the polymer was measured as follows: the polyvinyl chloride powder was placed in a sample holder immersed in an oil bath at 180°C. The time that elapsed before hydrogen chloride started to evolve provided a measure of the heat stability of the resin. This time was measured by carrying over the hydrogen chloride in nitrogen and absorbing it in water whose conductivity increased when the hydrogen chloride appeared. The stability of the polymer was characterised by the time required for this increase in conductivity to become apparent.

The time must exceed about 4 minutes and preferably about 8 minutes for the resin to exhibit satisfactory stability.

To assess the anti-static properties of the resin the polymer was pressed into a sheet which was placed in an electrical field at 8 kilovolts. The times required for charging and discharging the sample were measured. The polymer exhibits good anti-static properties if these times are less than about 3 minutes.

The specific conditions employed in each of the examples and the results of the evaluation tests are combined in the following table:

TABLE

| Examples | Nature and amount of emulsifying agent introduced at the start of polymerisation g/kg monomer | Nature and amount of emulsifying agent introduced later g/kg monomer | Caustic soda introduced at the end of the test g/kg monomer | Polymerisation time h.min | Agglomerates during Polymerisation g/kg monomer | Elementary particles microns | Mechanical stability of the latex sec | Heat stability of the polymer min | Anti-static properties Discharging time min | Charging time min |
|---|---|---|---|---|---|---|---|---|---|---|
| 1 | ammonium myristate 9 | — | — | 5.00 | 30 | 0.05–0.15 | 20 | 3 | G2S120 | >120 |

TABLE – Continued

| Examples | Nature and amount of emulsifying agent introduced at the start of polymerisation g/kg monomer | Nature and amount of emulsifying agent introduced later g/kg monomer | Caustic soda introduced at the end of the test g/kg monomer | Polymerisation time h.min | Agglomerates during Polymerisation g/kg monomer | Elementary particles microns | Mechanical stability of the latex sec | Heat stability of the polymer min | Anti-static properties | |
|---|---|---|---|---|---|---|---|---|---|---|
| | | | | | | | | | Discharging time min | Charging time min |
| 2 | ammonium myristate 11 | — | 1.5 | 5.00 | 30 | 0.05–0.15 | 120 | >30 | >120 | >120 |
| 3 | sodium alkyl sulphonate 11 | — | — | 3.00 | 30 | <0.03 | 5 | 3 | 0.5 | 0.5 |
| 4 | ammonium myristate 6 | sodium alkyl sulphonate 3 | 1 | 4.45 | 20 | 0.05–0.18 | 200 | 20 | 3 | 3 |
| 5 | ammonium myristate 3 | sodium alkyl sulphonate 6 | 0.5 | 4.30 | 15 | 0.05–0.2 | 500 | 7 | 2 | 3 |
| 6 | ammonium myristate 3 | sodium alkyl sulphonate 10 | 0.5 | 4.15 | 13 | 0.05–0.2 | >600 | 5 | 0.5 | 0.5 |
| 7 | ammonium stearate 3 | sodium alkyl sulphonate 10 | 0.4 | 4.45 | 13 | 0.05–0.22 | >600 | 4 | 0.5 | 0.5 |
| 8 | ammonium stearate 3 | sodium alkyl aryl sulphonate 10 | 0.4 | 5.15 | 12 | 0.06–0.23 | >600 | 4 | 1 | 0.6 |
| 9 | ammonium stearate 10 | sodium alkyl sulphonate 10 | 1.35 | 4.30 | 10 | 0.05–0.15 | >600 | 11 | 0.5 | 0.5 |
| 10 | ammonium stearate 15 | sodium alkyl sulphonate 10 | 2 | 4.15 | 10 | 0.05–0.12 | >600 | 12 | 0.6 | 1 |
| 11 | ammonium stearate 10 | sodium alkyl sulphonate 15 | 1.35 | 4.15 | 8 | 0.05–0.15 | >600 | 10 | 0 | 0 |
| 12 | ammonium stearate 10 | sodium alkyl sulphonate 20 | 1.35 | 4.15 | 8 | 0.05–0.15 | >600 | 6 | 0 | 0 |

I claim:

1. Process for the polymerisation of vinyl chloride in aqueous emulsion, comprising:
    starting the polymerisation in the presence of 0.1 to 1.5% by weight, calculated on the monomer charge, of an emulsifying agent selected from the group comprising the ammonium salts of long chain saturated fatty acids having 10 to 18 carbon atoms, and mixtures thereof,
    gradually introducing during polymerisation, when conversion has reached 5%, 0.3 to 2% by weight, calculated on the monomer charge, of an emulsifying agent selected from the group comprising alkaline alkyl sulphonates having 10 to 18 carbon atoms in the alkyl chain, alkaline alkyl aryl sulphonates having 10 to 18 carbon atoms in its alkyl chain, and mixtures thereof, and
    converting the ammonium salts into alkaline metal salts at the end of polymerisation.

2. Process for the polymerisation or copolymerisation of vinyl chloride in aqueous emulsion in accordance with claim 1, wherein the ammonium salt of a fatty acid is used in the proportion of 0.3 to 1% by weight calculated on the monomer charge.

3. Process for the polymerisation or copolymerisation of vinyl chloride in aqueous emulsion in accordance with claim 1, wherein the ammonium salt is derived from saturated fatty acids.

4. Process for the polymerisation or copolymerisation of vinyl chloride in aqueous emulsion in accordance with claim 1, wherein the emulsifying agent introduced during polymerisation is used in the proportion of 0.5 to 1.5% by weight calculated on the monomer charge.

5. Process for the polymerisation or copolymerisation of vinyl chloride in aqueous emulsion in accordance with claim 1, wherein the alkyl chain of the alkaline alkyl sulphonates and alkaline alkyl aryl is from 12 to 16 carbon atoms.

6. Process for the polymerisation or copolymerisation of vinyl chloride in aqueous emulsion in accordance with claim 1, wherein the alkaline sulphonate is continuously introduced into the polymerisation medium as soon as conversion has reached a value exceeding about 10% and until it has reached a value exceeding about 50%.

7. Process for the polymerisation or copolymerisation of vinyl chloride in aqueous emulsion in accordance with claim 1, wherein the ammonium salt is converted into an alkaline salt at the end of polymerisation by the addition of a basic compound of an alkali metal in the proportion of 0.01 to 0.3% by weight calculated on the monomer mixture.

8. Process for the polymerisation or copolymerisation of vinyl chloride in aqueous emulsion in accordance with claim 1, wherein the alkaline sulphonate is used in the proportion of 1.0 to 2.0% by weight calculated on the monomer charge.

9. Process for the polymerisation of vinyl chloride in aqueous emulsion in accordance with claim 1, wherein all of the sulphonate emulsifying agent is introduced before conversion reaches 80%.

* * * * *